US011411517B2

(12) United States Patent
Bourse et al.

(10) Patent No.: US 11,411,517 B2
(45) Date of Patent: Aug. 9, 2022

(54) METHOD FOR STARTING A PERMANENT MAGNET SYNCHRONOUS ELECTRIC MOTOR

(71) Applicant: SAFRAN ELECTRICAL & POWER, Blagnac (FR)

(72) Inventors: Wenceslas Bourse, Moissy-Cramayel (FR); Pascal Jacques Frédéric Guy Toutain, Moissy-Cramayel (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 35 days.

(21) Appl. No.: 17/277,705

(22) PCT Filed: Sep. 24, 2019

(86) PCT No.: PCT/EP2019/075646
§ 371 (c)(1),
(2) Date: Mar. 18, 2021

(87) PCT Pub. No.: WO2020/064695
PCT Pub. Date: Apr. 2, 2020

(65) Prior Publication Data
US 2021/0351729 A1  Nov. 11, 2021

(30) Foreign Application Priority Data

Sep. 26, 2018 (FR) ...................................... 1858809

(51) Int. Cl.
*H02P 6/08* (2016.01)
*H02P 6/20* (2016.01)
(52) U.S. Cl.
CPC ............ *H02P 6/20* (2013.01); *H02P 2207/05* (2013.01)
(58) Field of Classification Search
CPC ........... H02P 6/08; H02P 6/20; H02P 2207/05
See application file for complete search history.

(56) References Cited

U.S. PATENT DOCUMENTS 8,626,372 B2 *  1/2014  Kumar .................. F02D 41/221
123/406.26

FOREIGN PATENT DOCUMENTS

CN       103401488 B  *  6/2016
FR         3028112 A1     5/2016
(Continued)

OTHER PUBLICATIONS

Search Report from French Intellectual Property Office on corresponding FR application (FR1858809) dated Jun. 11, 2019.
(Continued)

*Primary Examiner* — Cortez M Cook
(74) *Attorney, Agent, or Firm* — Klein, O'Neill & Singh, LLP

(57) ABSTRACT

A method for starting a permanent magnet synchronous electric motor comprising a rotor and a stator comprising coils connected respectively to a plurality of phases and a conversion circuit connecting the plurality of phases to a power supply source in order to control the rotation of the rotor of the synchronous motor, the conversion circuit comprising a converter supplying power to a DC-AC converter comprising a plurality of controllable transistors for controlling the rotation of the rotor according to a plurality of successive control phases, the method comprising: ○ a step of controlling the transistors of the DC-AC converter according to a control table associating each control phase with a configuration of the transistors so as to determine an acceleration ramp of the rotor of the motor, ○ a step of determining an electrical angle A based on a predetermined acceleration ACC, and ○ a step of determining a control phase change signal Q if the electrical angle A is greater than a predetermined threshold angle $A_{seuil}$.

7 Claims, 7 Drawing Sheets

(56) References Cited

FOREIGN PATENT DOCUMENTS

WO     WO 2009/016939 A1     2/2009
WO     WO 2017/178752 A1     10/2017

OTHER PUBLICATIONS

International Search Report and Written Opinion on corresponding PCT application (PCT/EP2019/075646) from International Searching Authority (EPO) dated Dec. 6, 2019.

* cited by examiner

| | T1 | T2 | T3 | T4 | T5 | T6 | D | V |
|---|---|---|---|---|---|---|---|---|
| S1 | 0 | 1 | 0 | 1 | 0 | 0 | D1 | V1 |
| S2 | 0 | 0 | 1 | 1 | 0 | 0 | D2 | V2 |
| S3 | 0 | 0 | 1 | 0 | 1 | 0 | D3 | V3 |
| S4 | 1 | 0 | 0 | 0 | 1 | 0 | D4 | V4 |
| S5 | 1 | 0 | 0 | 0 | 0 | 1 | D5 | V5 |
| S6 | 0 | 1 | 0 | 0 | 0 | 1 | D6 | V6 |

|    | T1 | T2 | T3 | T4 | T5 | T6 | D  | V  |
|----|----|----|----|----|----|----|----|----|
| S1 | 0  | 1  | 0  | 1  | 0  | 0  | ↑Q | V1 |
| S2 | 0  | 0  | 1  | 1  | 0  | 0  | ↑Q | V2 |
| S3 | 0  | 0  | 1  | 0  | 1  | 0  | ↑Q | V3 |
| S4 | 1  | 0  | 0  | 0  | 1  | 0  | ↑Q | V4 |
| S5 | 1  | 0  | 0  | 0  | 0  | 1  | ↑Q | V5 |
| S6 | 0  | 1  | 0  | 0  | 0  | 1  | ↑Q | V6 |

METHOD FOR STARTING A PERMANENT MAGNET SYNCHRONOUS ELECTRIC MOTOR

TECHNICAL FIELD

The present invention relates to a method for starting a compressor, in particular for supplying a fuel cell mounted in an aircraft with oxygen.

A fuel cell makes it possible to produce electric energy from an electrochemical reaction between different fluids. Such a fuel cell is supplied with dihydrogen and dioxygen which react in the fuel cell in order to generate electric energy. Conventionally, the fuel cell is supplied with dioxygen in the form of air supplied by a compressor.

As illustrated in FIG. 1, a compressor 1 comprises a permanent magnet synchronous motor 100 that is speed controlled by a conversion circuit 200 of the "Pulse Amplitude Modulation" type. As is known, motor 100 comprises a rotor and a stator comprising coils capable of generating a magnetic field as a function of the current received. In this example, motor 100 comprises three phases P1, P2, P3, each of which is controlled by the conversion circuit 200. The phases P1, P2, P3 are connected to the stator coils of motor 100. In order to control motor 100 at a very high speed, in the order of 170,000 rpm, the conversion circuit 200 has to control the phases P1, P2, P3 of motor 100 at a very high frequency, for example in the order of 5.5 KHz.

Such a conversion circuit 200 comprises a DC-DC converter 210 and a DC-AC converter 220 which are connected in series. The DC-DC converter 210 is connected to a power source 2 as an input and to the DC-AC converter 220 as an output to provide to it a lower supply voltage than that provided by power source 2. The DC-AC converter 220, also known as an inverter, comprises a plurality of transistors T1-T6 which are controlled in order to provide the desired current to each of the phases P1, P2, P3 of the motor 100. In a known way, as illustrated in FIG. 1, the converters 210, 220 are controlled by a driving calculator 300 in order to accurately drive the phases P1, P2, P3 of the motor 100.

To allow a controlled rotation of the rotor of the motor 100, the current flowing in the stator coils should be accurately driven as a function of the position of the rotor in relation to the stator. To determine position of the rotor, several solutions are known from prior art.

According to a first solution, it has been provided in document WO2017/178752A1 to install three Hall effect sensors at the motor stator, angularly spaced by 120°, in order to directly detect the position of the rotor. However, the installation of such sensors is expensive and cumbersome. Indeed, it would be desirable to monitor the position of the rotor without adding equipment to the motor.

According to a second solution, it has been provided in document FR3028112A1 to determine the position of the rotor without adding sensors from the observation of the electromotive force value of the motor. However, such a solution can only be implemented when the motor is in steady state. Unfortunately, this solution does not allow to control starting of the motor, that is a transient phase. Indeed, the observation of the electromotive force value is only relevant from a minimum speed of rotation of the motor.

In practice, to allow starting, the driving calculator 300 comprises a driving table, represented in FIG. 2, defining a plurality of successive control phases S1-S6. Each control phase S1-S6 determines current controlling of phases P1, P2, P3, that is driving of transistors T1-T6 (OFF 0 or ON 1 state), in order to impose a predetermined speed set point V1-V6 for a determined period of time D1-D6. In other words, the driving table defines a predetermined acceleration ramp, represented in FIG. 3 by the linear slope of the speed set point Vc, to allow motor 100 to start. However, such a solution has drawbacks.

Indeed, the driving table is theoretical and does not take actual operating conditions of motor 100 into account, especially tightening torque of the bearings of motor 100, which torque varies according to the speed of rotation of the motor, inductance value of the converter which varies the peak current, value of the voltage delivered by the power supply 2 to compressor 1, operating temperature of compressor 1, manufacturing tolerances of motor 100, etc. In fact, the speed of the rotor of motor 100 does not follow the linear acceleration slope but varies about this acceleration ramp, which generates ripples in the speed VR with respect to the linear slope of the speed set point Vc, as illustrated in FIG. 3 representing the variation of speed V as a function of time t. Such ripples cause repeated deceleration/acceleration of motor 100 which increases wear thereof and may prevent starting thereof.

In order to maximize the chances of starting motor 100, the driving calculator 300 can raise the control setpoint of the DC-DC converter 210, which however has the drawback of increasing wear of electronic elements. Furthermore, to increase the chances of starting, the slope of the acceleration ramp can also be reduced, which has the drawback of reducing the motor starting time.

A device for starting a brushless motor is also known from patent application WO2009/016939A1. In particular, it teaches to change the phase of an electrical angle in order to adjust the speed. In particular, it teaches to use static data to correct value and timing of the electrical phase. In this document, the static correction data are derived from theoretical curves related to the electrical, mechanical and environmental characteristics of the complete system (electric motor and electric charging). Such a system does not allow dynamic correction. On the other hand, patent application WO2009/016939A1 does not teach a DC-DC converter.

The invention therefore aims at overcoming these drawbacks by providing a new system and a new method for starting a permanent magnet synchronous motor in an aircraft in order to allow robust and fast starting without the need to add equipment to the motor. Another objective is to limit speed oscillations.

Although the invention was originally developed to solve a fuel cell compressor problem, the invention applies to any starting of a permanent magnet synchronous motor.

SUMMARY

For this purpose, the invention relates to a method for starting a permanent magnet synchronous electric motor comprising a rotor and a stator comprising coils respectively connected to a plurality of phases and a conversion circuit connecting the plurality of phases to an electric power source in order to control rotation of the rotor of said synchronous motor, said conversion circuit comprising a DC-DC converter supplying a DC-AC converter comprising a plurality of controllable transistors for controlling the rotation of the rotor according to a plurality of successive control phases, said method comprising a step of controlling the transistors of the DC-AC converter according to a driving table associating each control phase with a configuration of said transistors so as to determine an acceleration ramp of the rotor of the motor.

The method is remarkable in that it comprises:
a step of determining an electrical angle A from a predetermined acceleration ACC, and
a step of determining a control phase change signal Q if the electrical angle A is greater than a predetermined threshold angle $A_{seuil}$.

By virtue of the method according to the invention, the control phase change is dynamically determined from the estimated motor speed and not from a predetermined table. This allows the motor acceleration ramp to be optimized in order to limit the motor starting time.

Preferably, the driving table comprises six control phases with a predetermined threshold angle of 60°. The threshold angle thus corresponds to one-sixth of a motor turn.

Advantageously, the step of determining an electrical angle A comprises a first step of integrating the predetermined acceleration ACC in order to derive a speed V and a second step of integrating the speed V in order to derive the electrical angle A.

Preferably, the first simple integration step is determined from the equation:

$$V(n) = V(n-1) + T_s * ACC + W$$

in which:
V(n) is the electric speed V at instant n,
V(n−1) is the electric speed V at instant n−1,
$T_s$ is a sampling constant,
ACC is a predetermined acceleration, and
W is a variable parameter.

Still preferably, the variable parameter W is determined from the equation:

$$W = K * V(n-1)$$

wherein K is a speed correction constant.

Thus, the current speed V(n) is automatically corrected as a function of the previous speed V(n−1).

Preferably, the method comprises an automatic step of detecting a deceleration of the motor rotor, the value of the speed correction constant K being different from 0 if a rotor deceleration is detected. Preferably, the value of the speed correction constant K is between 2 and 8%, preferably in the order of 5%, if a rotor deceleration has been detected. This allows the motor control to be adapted to compensate for a deceleration and thus to limit such a deceleration. The speed set point is thus adapted automatically.

According to one aspect of the invention, a deceleration is detected when the current $I_{DCAC}$ of the DC-AC converter is negative.

According to another aspect of the invention, a deceleration is detected when the voltage $U_{DCAC}$ of the DC-AC converter is increasing over time.

Still preferably, the step of detecting a deceleration comprises a substep of detecting an increase in the motor phase current beyond the control current. This allows a deceleration to be readily detected.

The invention further relates to a compressor for aircraft, said compressor comprising:
a permanent magnet synchronous electric motor comprising a rotor and a stator comprising coils respectively connected to a plurality of phases and a conversion circuit connecting the plurality of phases to an electrical power source in order to control rotation of the rotor of said synchronous motor, said conversion circuit comprising a DC-DC converter supplying a DC-AC converter comprising a plurality of controllable transistors in order to control rotation of the rotor according to a plurality of successive control phases, and
a calculator configured to implement the method as previously described.

Preferably, the compressor is a fuel cell air supply compressor.

BRIEF DESCRIPTION OF THE DRAWINGS

The invention will be better understood upon reading the following description, given only by way of example, and referring to the appended drawings in which.

It should be noted that the figures set out the invention in a detailed manner in order to implement the invention, said figures can of course be used to better define the invention if necessary.

DETAILED DESCRIPTION

The invention will be set forth for a compressor motor of an aircraft. Nevertheless, it goes without saying that the invention applies to any permanent magnet synchronous electric motor.

Figures 1, 2:
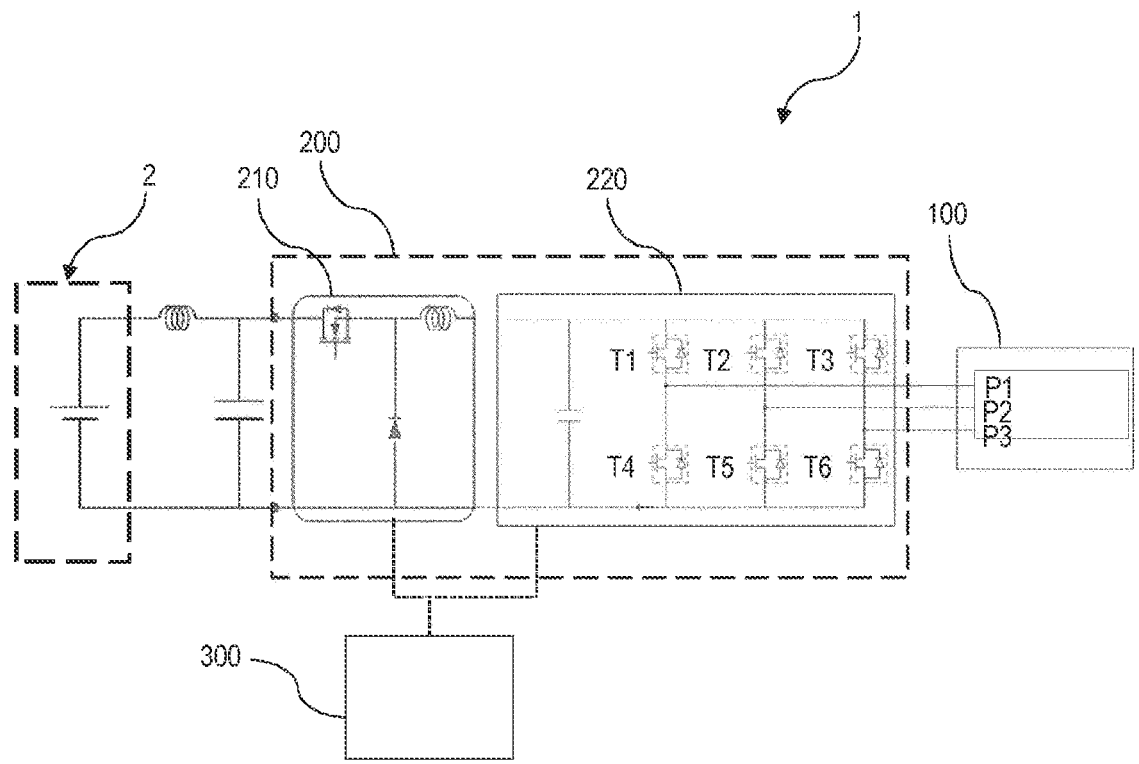
FIG. 1 is a schematic representation of a conversion circuit and a motor of a compressor according to prior art (previously described)
FIG. 2 is a schematic representation of a driving table of the DC-AC converter of the conversion circuit of FIG. 1.
Figure 3:
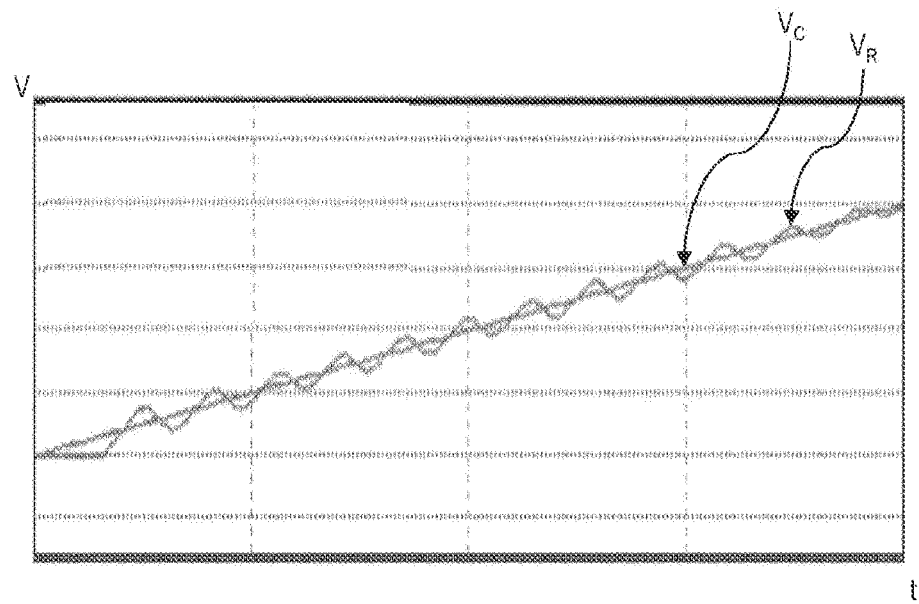
FIG. 3 is a schematic representation of the curves of the speed set point Vc and the speed $V_R$ of the motor of the compressor of FIG. 1.
Figure 4:
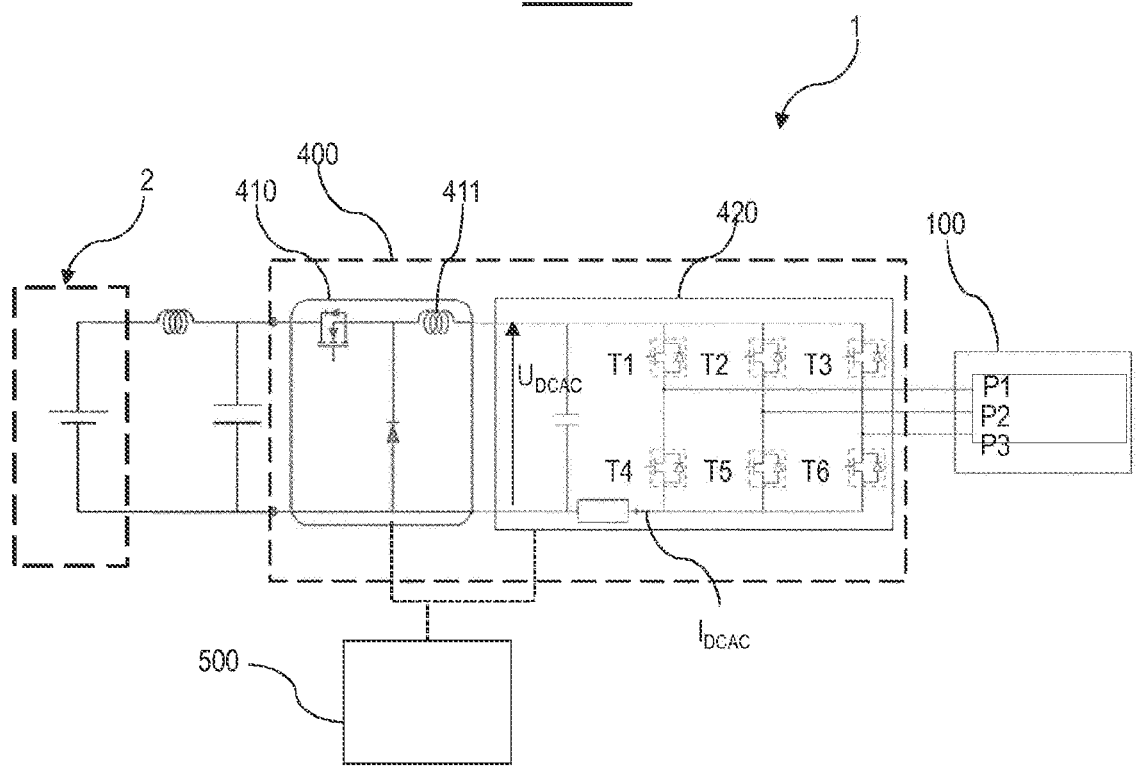
FIG. 4 is a schematic representation of a conversion circuit and a motor of a compressor according to the invention.

One embodiment of a compressor 1 according to the invention is schematically represented in FIG. 4. In this example, Compressor 1 is a fuel cell supply compressor (not represented). Such compressor 1 is configured to provide air comprising dioxygen for the electrochemical reaction generating electric energy. However, the invention applies to any type of compressor of an aircraft.

Still with reference to FIG. 4, compressor 1 is supplied with electric energy by a power source 2. Power source 2 is configured to provide electric energy to compressor 1. The compressor comprises a motor 100, a conversion circuit 400 connecting said motor 100 to power source 2, and a calculator 500 for controlling the conversion circuit 400.

Motor 100 is a permanent magnet synchronous electric motor comprising a rotor (not represented) and a stator (not represented). The rotor has a cylindrical shape about which the stator extends. The rotor has permanent magnets distributed about the periphery of the cylindrical shape. The stator has coils angularly distributed about the rotor. Preferably, the stator comprises three coils angularly spaced by 120° from each other. The conversion circuit 400 is configured to supply the coils so that they generate an electromagnetic field reacting with the permanent magnets in the rotor to cause it to rotate. Since the operation of such a permanent magnet synchronous motor is known, it will not be described in more detail. In the example illustrated in FIG. 4, motor 100 comprises three coils. Motor 100 is a three-phase motor and supplied with an electric current comprising three phases P1, P2, P3, with each phase P1, P2, P3 supplying one of the coils.

The conversion circuit 400 directs the electric current supplied by power source 2 into the different coils of motor 100 in order to supply the latter successively and thus allow the rotor to rotate. For this purpose, the conversion circuit 400 comprises a DC-DC converter 410 and a DC-AC converter 420.

The DC-DC converter 410 is configured to be supplied by power source 2 with a so-called "input" voltage. The DC-DC converter 410 is configured to deliver a so-called "output" voltage to the DC-AC converter 420, the value of which is different from that of the input voltage. The DC-DC converter 410 can be of the step-up type, also called "boost" converter, if the output voltage is higher than the input voltage, or of the step-down type, also called "buck" converter, if the output voltage is lower than the input voltage. In this example of implementation, the DC-DC converter 410 is a step-down type converter.

As illustrated in FIG. 4, the DC-DC converter 410 comprises a coil 411 configured to be charged by the input voltage. When the coil 411 discharges, it increases the value of the output voltage. Since the operation of such a DC-DC converter 410 is known, it will not be described in more detail. In order to control the DC-DC converter 410, the calculator 500 is configured to determine the maximum value of the current flowing through coil 411 when the latter is charged. This allows charging the coil 411 to be configured to obtain a desired value of the output voltage.

The DC-AC converter 420, also called an inverter, is configured to transform a direct current into an alternating current to supply the various phases P1-P3 of motor 100. The DC-AC converter 420 is configured to be supplied by power source 2 with direct current from the DC-DC converter 410. The DC-AC converter 420 is configured to provide a current to each of the phases P1-P3 of motor 100.

Figures 5, 6:
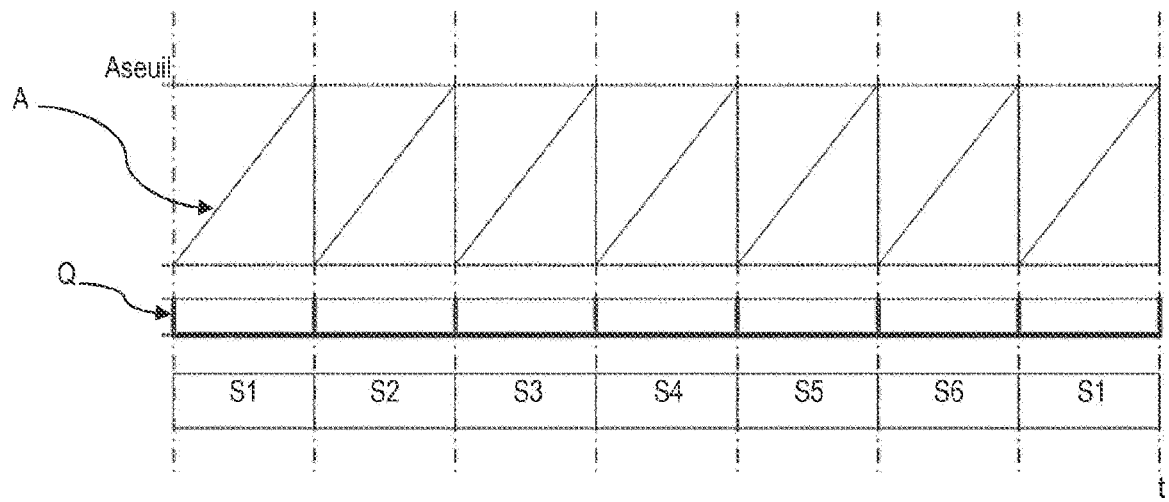
FIG. 5 is a schematic representation of a driving table of the DC-AC converter of the conversion circuit of FIG. 4.
FIG. 6 is a schematic representation of the current angle for different control phases of the DC-AC converter of FIG. 4.

As illustrated in FIG. 4, the DC-AC converter 420 comprises a plurality of controllable transistors T1-T6 in order to direct the current through the various coils. As illustrated in FIG. 5, the state of the plurality of transistors T1-T6 is defined according to the control phase S1-S6 in which they are. In other words, for each control phase S1-S6, the state of each of the transistors T1-T6 is predetermined. This makes it possible to determine the power supply of each phase P1-P3 of motor 100 during a control phase S1-S6. The transistors T1-T6 are controlled by the calculator 500 as will be described below.

The calculator 500 is configured to control, on the one hand, the DC-DC converter 410 and, on the other hand, the DC-AC converter 420. As previously described, the calculator 500 is configured to send a current set point to the DC-DC converter 410. This current set point determines the maximum current flowing through coil 411 when the coil is charged in order to determine the desired output voltage.

The calculator 500 is also electrically connected to the DC-AC converter 420 in order to control it. In particular, the calculator 500 controls the state of the transistors T1-T6 from the table illustrated in FIG. 5 according to the control phase S1-S6. In this table, the value "0" corresponds to the OFF state of the transistor and the value "1" to the ON state.

According to the invention, the calculator 500 is configured to change the control phase S1-S6 as a function of the value of an electrical angle A. Thus, the change of control phase S1-S6 is no longer statically carried out by reading a predetermined period of time from a table, but dynamically in order to take features of said motor 100 into account.

Figure 7:
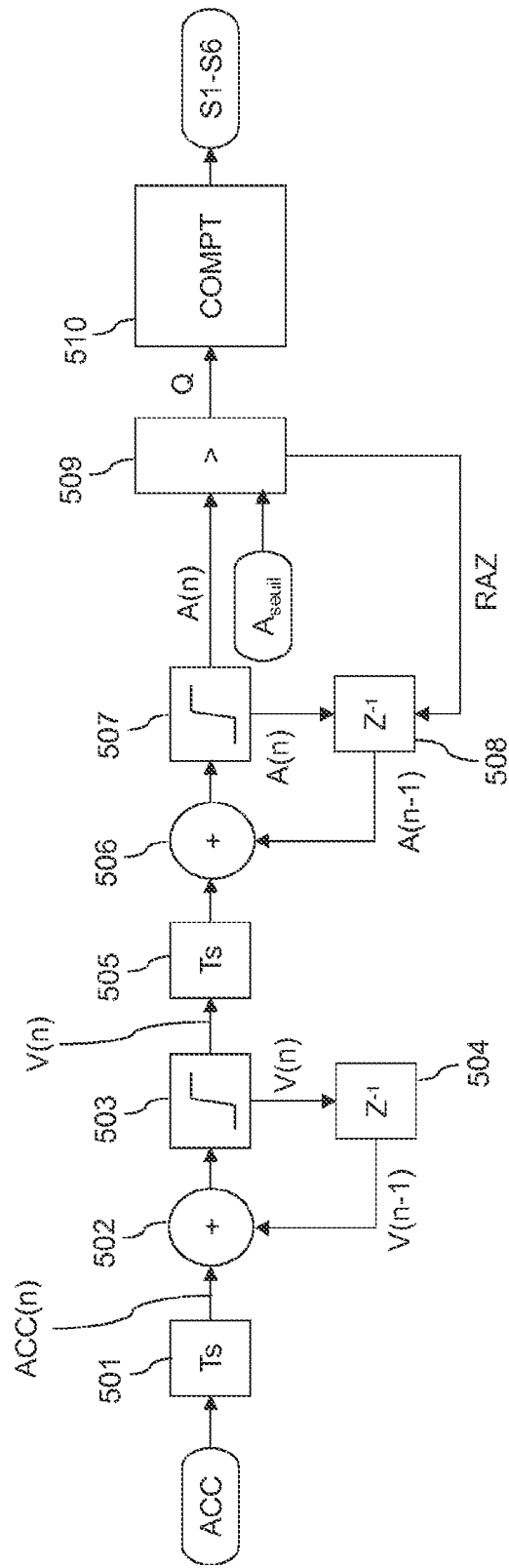
FIG. 7 is a schematic representation of the steps of determining a phase change signal Q implemented by the calculator.

A first implementation of a method for starting motor 100 is represented in FIG. 7.

In this example, the calculator 500 comprises a sampler 501 configured to sample a predetermined acceleration ACC, stored in a memory, according to a sampling constant Ts and an adder 502 which allows the previous speed V(n−1) to be added to determine the current speed V(n). This predetermined acceleration ACC is then integrated in order to determine the speed. The value of this acceleration ACC is defined in order to meet the desired starting time.

Mathematically, this first phase can be described from the following equation:

$$V(n)=V(n-1)+T_s*ACC$$

in which:
V(n) is the current electric speed at instant n,
V(n−1) is the electric speed at instant n−1,
$T_s$ is a sampling constant,
ACC is the predetermined acceleration.

Still with reference to FIG. 7, the calculator 500 comprises a saturator 503 which is placed at the output of the adder 502 in order to restrict the current speed V(n). This current speed V(n) is transmitted to a memory 504 which provides the previous speed V(n−1) to the adder 502. During this first phase, the predetermined acceleration ACC is integrated to obtain the current speed V(n).

Analogously, the calculator 500 allows the current speed V(n) to be integrated to obtain the electrical angle A(n) which corresponds to the angular position of the rotor.

Also, still with reference to FIG. 7, the current speed V(n) is transmitted to a sampler 505 configured to sample the current speed V(n) according to a predetermined sampling constant. The calculator 500 further comprises an adder 506 that enables the previous electrical angle A(n−1) to be added to determine the current electrical angle A(n). Analogously to the foregoing, the calculator 500 comprises a saturator 507 placed at the output of the adder 506 in order to restrict the value of the current electrical angle A(n).

The current electrical angle A(n) is transmitted to a memory 508 which provides the previous angle A(n−1) to the adder 506 and, on the other hand, to a comparator 509 configured to compare the current angle A(n) to a threshold angle $A_{seuil}$. When the current angle A(n) is greater than the threshold angle $A_{seuil}$, the calculator 500 emits a phase change signal Q in order to change the control phase S1-S6 and switch state of the transistors T1-T6. In this example, calculator 500 comprises a counter 510 in order to count the phase change signals Q and thus determine the current control phase S1-S6.

In the case illustrated in FIG. 6 with six control phases S1-S6, the threshold angle $A_{seuil}$ is equal to 60° elec, that is one sixth of a turn. During phase change Q, the value of the current angle A is reset to zero in order to detect the next threshold angle exceedance as illustrated in FIG. 7.

With reference to FIG. 6, the variation of the current angle A over time expressed in electrical degrees is represented. As soon as the threshold angle is exceeded, the electrical angle A is reset to zero and the transistors T1-T6 are switched to the next control phase S1-S6. Such a phase change is optimal since it is a function of the intrinsic characteristics of motor 100. By virtue of the invention, the angular position of the rotor is accurately determined without the need for additional motor tools.

Figure 8:
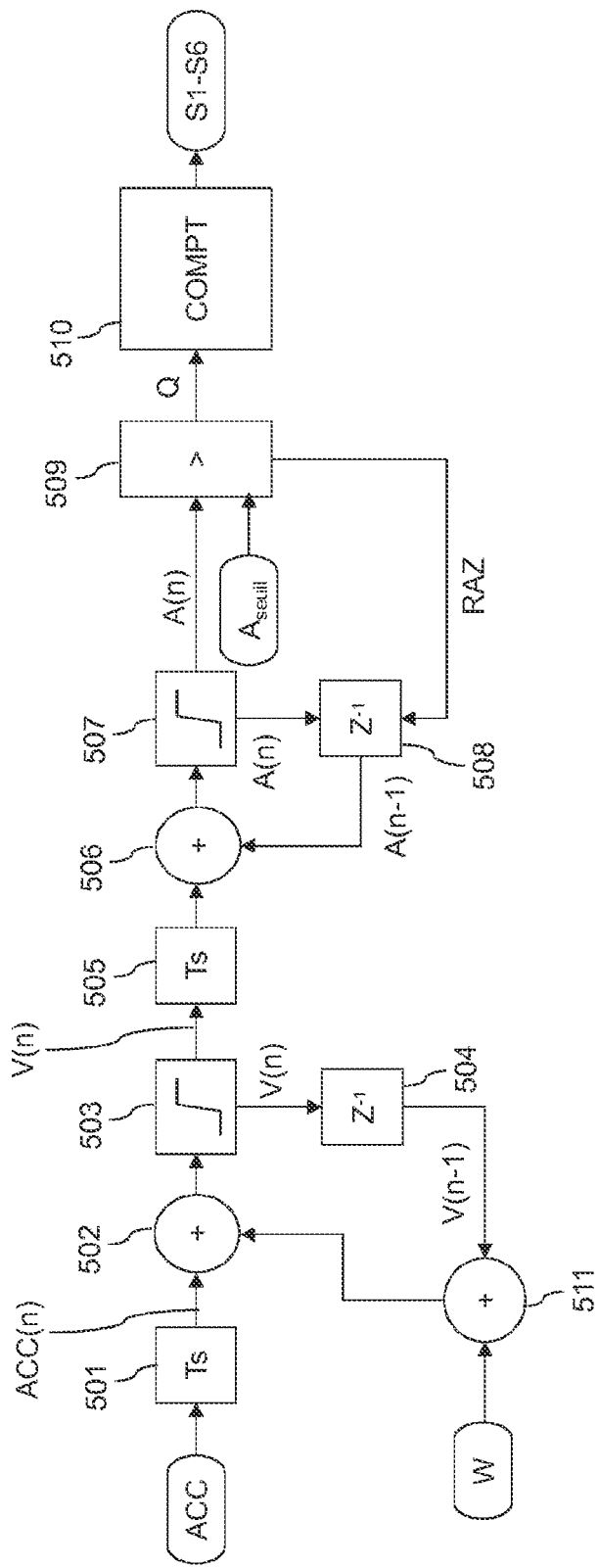
FIG. 8 is a schematic representation of the steps of determining a phase change signal Q with speed correction.

According to a preferred aspect of the invention, the calculator 500 comprises a correction constant K in order to limit the speed ripple of motor 100 about the speed set point determined by the control phases S1-S6. For this purpose, with reference to FIG. 8, the calculator 500 comprises an adder 511 which allows the addition of a variable parameter W which is a function of the correction constant K and speed V(n−1).

With a correction, the current speed V(n) is defined according to the following formula:

$$V(n)=V(n-1)+T_s*ACC+W$$

in which:

W is a variable parameter determined from the equation:

$$W=K*V(n-1)$$

where K is the speed correction constant.

Several modes of calculation of the correction constant K will now be set forth. The aim is to detect a deceleration in the speed of motor 100 when the same wishes to return to its speed set point determined by the control phase S1-S6. By using a correction constant K, the speed set point can be increased and decelerations can thereby be limited.

Figure 9:
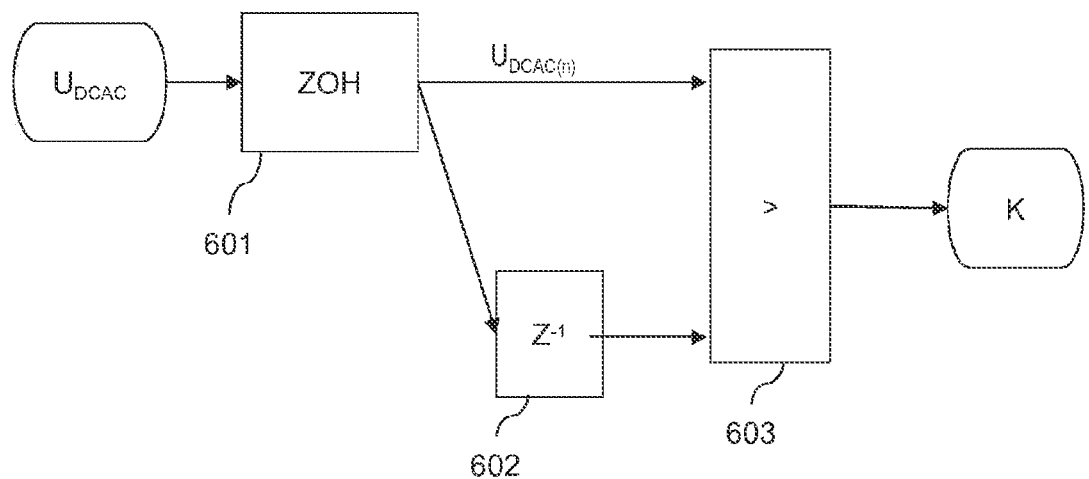
FIG. 9 is a schematic representation of a first example of determining a correction constant from a voltage measurement of the DC-AC converter.

According to a first example, an increase in the voltage $U_{DCAC}$ in the DC-AC converter 420 is detected. As illustrated in FIG. 9, calculator 500 comprises a sampler 601 configured to sample the voltage $U_{DCAC}$ of the DC-AC converter 42 while shifting the phase change signal Q by a predetermined delay, preferably in the order of 50 μs. Such a shift allows sampling as close as possible to the maximum voltage. Each value of the voltage $U_{DCAC(n)}$ is then compared by a comparator 602 to its previous value $U_{DCAC(n-1)}$ according to the equations:

If $U_{DCAC(n)}>U_{DCAC(n-1)}$+Hysteresis and if $U_{DCAC(n-1)}>U_{DCAC(n-2)}$+Hysteresis, the value of the speed correction constant K is different from 0, otherwise the value of the speed correction constant K is equal to 0.

Preferably, the value of the speed correction constant K is validated after analysis of several consecutive samples to confirm the increase in the voltage $U_{DCAC}$, in particular its maximum value during an operating phase S1-S6. Instead of sampling for each operating phase S1-S6, a continuous sampling could also be implemented with a sufficiently high sampling frequency in order to detect the envelope of the voltage $U_{DCAC}$ and thus facilitate the detection of its maximum value.

According to a second example, an increase of the current $I_{DCAC}$ in the DC-AC converter 420, that is, the current between the capacitor and the arms of the DC-AC converter 420 as illustrated in FIG. 4, is detected.

Figure 10:
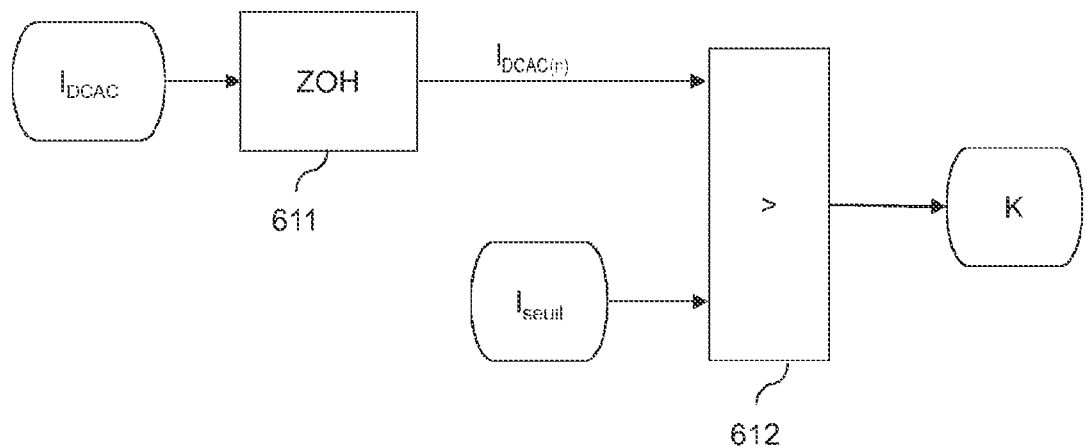
FIG. 10 is a schematic representation of a second example of determining a correction constant from a current measurement of the DC-AC converter.

With reference to FIG. 10, analogously to FIG. 9, the calculator 500 is configured to sample the current $I_{DCAC}$ of the DC-AC converter 420. Each current value $I_{DCAC(n)}$ is then compared to a current threshold Iseuil, in order to determine the correction constant K. In this example, the current threshold Iseuil is equal to 0. If the current $I_{DCAC(n)}$ of the DC-AC converter 420 is negative, it means that the rotor is decelerating and the speed set point should be increased. Also, if deceleration of the rotor is detected, the value of the speed correction constant K is set to be different from 0, preferably between 2 and 8%, preferably in the order of 5%.

The calculator 500 is thus configured to correct the speed set point of the acceleration ramp in order to optimize the starting time of motor 100. In an advantageous manner, by virtue of the correction, the ripple of the rotor speed is advantageously reduced.

Figure 11:
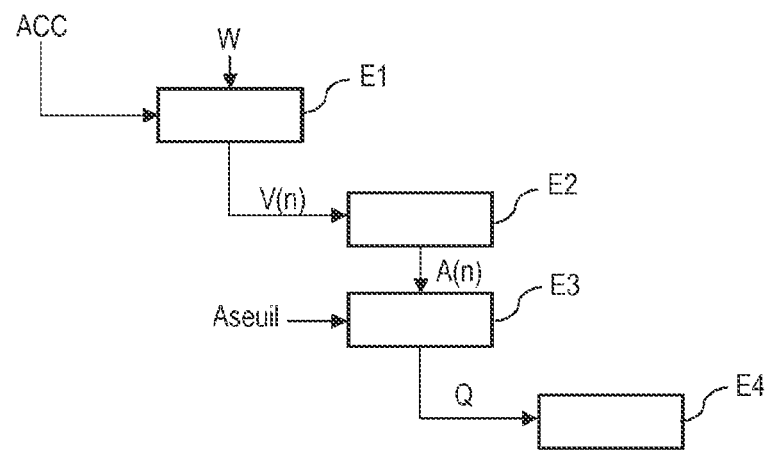
FIG. 11 is a schematic representation of one implementation of the motor starting method according to the invention.

A form of implementation of the method for starting a synchronous motor 100 according to the invention will now be described with reference to FIG. 11.

To cause the motor 100 to be rotated, the calculator 500 controls the state of the transistors T1-T6 according to the driving table illustrated in FIG. 5 which defines the successive control phases S1-S6. The acceleration ACC of the rotor of motor 100 is predetermined.

To switch from one control phase S1-S6 to the next control phase S1-S6, the calculator 500 performs, in a step E1, a first simple integration of the predetermined acceleration ACC in order to derive the current speed V(n) from the equation:

$$V(n)=V(n-1)+T_S*ACC+W$$

Preferably, during this step, the calculator 500 determines the value of the variable parameter W from the detection of a deceleration of the motor 100 by one of the methods previously set out.

The calculator 500 then performs, in a step E2, a second simple integration of the speed V(n) thus derived in order to derive a current angle A(n) therefrom. The calculator 500 thus generates an angular signal A illustrated in FIG. 6. When the angular signal A reaches the predetermined threshold angle $A_{threshold}$, a phase change signal Q is activated in a step E3 in order to switch to the next operating phase S1-S6, which modifies the state of transistors T1-T6 (Step E4). In addition, the current angle A(n) is reset to zero.

In this way, the calculator 500 controls successive changes of the individual control phases S1-S6 in order to allow acceleration of the motor 100 up to its starting speed.

Figure 12:
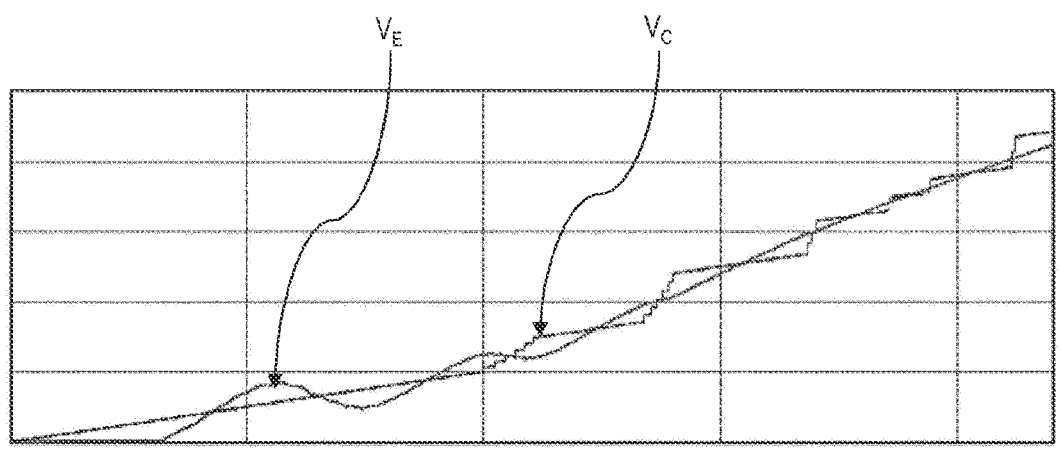
FIG. 12 is a schematic representation of the estimated motor speed $V_E$ and the speed set point Vc with correction.

By virtue of the method according to the invention, the change in control phase S1-S6 is determined from the rotor speed and not from a predetermined table. This makes it possible to adapt the acceleration ramp to possible decelerations of motor 10 and thus to limit the starting period of time of the motor. As illustrated in FIG. 12, the increase in the estimated speed VE is rapid. Moreover, by virtue of the automatic correction of the speed set point Vc, oscillations are significantly mitigated.

The invention claimed is:

1. A method for starting a permanent magnet synchronous electric motor comprising a rotor and a stator comprising coils respectively connected to a plurality of phases and a conversion circuit connecting the plurality of phases to an electric power source in order to control rotation of the rotor of said synchronous motor, said conversion circuit comprising a DC-DC converter supplying a DC-AC converter comprising a plurality of controllable transistors for controlling the rotation of the rotor according to a plurality of successive control phases, said method comprising:

a step of controlling the transistors of the DC-AC converter according to a driving table associating each control phase with a configuration of said transistors so as to determine an acceleration ramp of the rotor of the motor, which method comprises:
a step of determining an electrical angle A from a predetermined acceleration ACC, the step of determining an electrical angle A comprising:
a first step of integrating the predetermined acceleration ACC in order to derive a speed V from the following equation:

$$V(n)=V(n-1)+T_S*ACC+K*V(n-1)$$

in which:
V(n) is the electric speed V at instant n,
V(n−1) is the electric speed V at instant n−1,
$T_S$ is a sampling constant,
ACC is the predetermined acceleration, and
K is a speed correction constant,
a second step of integrating the speed V in order to derive the electrical angle A and
a step of determining a control phase change signal Q if the electrical angle A is greater than a predetermined threshold angle Aseuil.

2. The method according to claim 1, wherein, since the driving table comprises six control phases, the predetermined threshold angle Aseuil is 60°.

3. The method according to claim 1, comprising an automatic step of detecting a deceleration of the rotor of the motor, the value of the speed correction constant K being different from 0 if a deceleration of the rotor is detected.

4. The method according to claim 3, wherein the value of the speed correction constant K is between 2 and 8% if a deceleration of the rotor has been detected.

5. The method according to claim 3, wherein deceleration is detected when the current $I_{DCAC}$ of the DC-AC converter is negative.

6. The method according to claim 3, in which deceleration is detected when the voltage $U_{DCAC}$ of the DC-AC converter is increasing over time.

7. A compressor for aircraft, said compressor comprising:
a permanent magnet synchronous electric motor comprising a rotor and a stator comprising coils respectively connected to a plurality of phases, and a conversion circuit connecting the plurality of phases to an electric power source in order to control rotation of the rotor of said synchronous motor, said conversion circuit comprising a DC-DC converter supplying a DC-AC converter comprising a plurality of controllable transistors in order to control rotation of the rotor according to a plurality of successive control phases, and
a calculator configured to implement the method according to claim 1.

* * * * *